United States Patent [19]
Ishino et al.

[11] Patent Number: 5,491,369
[45] Date of Patent: Feb. 13, 1996

[54] MAGNETOSTRICTIVE TORQUE SENSOR SHAFT

[75] Inventors: Renshiro Ishino, Kobe; Taro Saito, Osaka; Matsumi Sunahata, Sakia, all of Japan

[73] Assignee: Kubota Corporation, Osaka, Japan

[21] Appl. No.: 211,885
[22] PCT Filed: Aug. 23, 1993
[86] PCT No.: PCT/JP93/01175
 § 371 Date: Apr. 19, 1994
 § 102(e) Date: Apr. 19, 1994
[87] PCT Pub. No.: WO94/04896
 PCT Pub. Date: Mar. 3, 1994

[30] Foreign Application Priority Data

Aug. 24, 1992 [JP] Japan ................... 4-223110

[51] Int. Cl.⁶ .................................................. H01L 41/12
[52] U.S. Cl. ...................................................... 310/26
[58] Field of Search .................................................. 310/26

[56] References Cited

U.S. PATENT DOCUMENTS 4,933,580  6/1990  Ishino et al. ........................... 310/26

FOREIGN PATENT DOCUMENTS

| 59-164931 | 9/1984 | Japan. |
| 169326 | 7/1989 | Japan. |
| 1-189970 | 7/1989 | Japan. |
| 1-169983 | 7/1989 | Japan. |
| 2-221830 | 9/1990 | Japan. |
| 3-68826 | 3/1991 | Japan. |
| 3-282338 | 12/1991 | Japan. |
| 4-1542 | 1/1992 | Japan. |
| 4-155232 | 5/1992 | Japan. |
| 4-359127 | 12/1992 | Japan. |

*Primary Examiner*—Mark O. Budd
*Attorney, Agent, or Firm*—Barnes, Kisselle, Raisch, Choate, Whittemore & Hulbert

[57] ABSTRACT

Method for producing a magnetostrictive torque sensor shaft and a torque sensor shaft made according to the method. Knurl grooves are formed on the surface of shaft base material in oblique relation to the axis thereof, which are then subjected to heat treatment. Subsequently, material having less crystallomagnetic anisotropy and a large magnetostriction constant is deposited by plating, thermal spraying or otherwise at least on the surface of the knurl grooves included in the outer periphery of the shaft base material thereby to form a magnetostrictive layer. Preferably, the magnetostrictive layer is comprised of an FeNi alloy plated layer whose Fe component content is more than 0% but less than 25%. Thus, a sensor shaft is obtained which can be suitably used in constructing a magnetostrictive torque sensor having high performance characteristics. In order to improve the bond between the shaft base material and the magnetostrictive layer, it is preferable to subject the surface of the shaft base material to surface treatment such as shot peening and/or nickel strike plating, prior to the step of magnetostrictive layer forming. This surface treatment makes it possible to obtain a torque sensor having good service durability.

6 Claims, 10 Drawing Sheets

MAGNETOSTRICTIVE TORQUE SENSOR SHAFT

FIELD OF THE INVENTION

The present invention relates to a method for producing a magnetostrictive torque sensor shaft and torque sensor shaft of the type.

BACKGROUND OF THE INVENTION

Magnetostrictive torque sensor shafts of the type having a magnetostrictive metal layer of a chevron configuration formed on the surface of a round bar-shaped shaft base material by plating, thermal spraying or otherwise which functions as a magnetically anisotropic portion have been known as disclosed in, for example, Japanese Patent Application Laid-Open Nos. 59-164931 and 3-68826.

Such a torque sensor shaft of the type having a magnetostrictive metal layer formed over the entire peripheral surface of a rod-shaped shaft base material has also been known as described in, for example, Japanese Patent Application Laid-Open No. 4-359127.

A different type of magnetostrictive torque sensor shaft having a magnetically anisotropic portion in the form of grooves formed by knurling on the surface of the shaft base material has been known as described in, for example, Japanese Patent No. 169326.

Further, there have been known magnetostrictive torque sensor shafts of the type having such knurl grooves subjected to shot peening thereby to attain hysteresis reduction and sensitivity improvement when the shaft is incorporated into a torque sensor, so as to insure stable sensor performance, as taught in, for example, Japanese Patent Application Laid-Open No. 2-221830.

Unfortunately, torque sensor shafts having a magnetostrictive metal layer of chevron configuration formed by plating and/or thermal spraying on the surface of the shaft base material involve a disadvantage that masking and etching operations are required for the formation of the magnetostrictive layer, which requires a complex process. Another problem is that torque sensors using such a shaft have no sufficient sensitivity justifiable from the standpoint of practical application. A further problem is that the magnetostrictive metal layer formed by plating and/or thermal spraying has a drawback in respect of service durability.

With torque sensor shafts having a magnetostrictive metal layer formed over the entire periphery of the shaft base material, it is pointed out that the step of imparting magnetic anisotropy to the magnetostrictive metal layer involves some difficulty and, in addition, the magnetostrictive metal layer lacks service durability.

Torque sensor shafts having knurl grooves formed on the surface of the base material have no sufficient sensitivity even if any strictly selected shaft material is used for the shaft.

In contrast to those having grooves formed merely by knurling, shafts having knurl grooves subjected to shot peening can be advantageously used to provide a torque sensor having good sensitivity characteristics which is suitable for practical application. However, when a torque sensor having further improved sensitivity is required in response to the demands of growing markets for sensors, such a shaft is still insufficient to meet the requirement.

In Japanese Patent Application Laid-Open No. 3-282338 there is disclosed a method which comprises forming knurl grooves on the surface of the shaft base material, then forming a magnetostrictive metal layer on the surface of the knurl grooves, thereby to develop magnetic anisotropy on the surface of the shaft. According to such arrangement, high sensitivity measurement of applied torque can be reasonably expected.

However, with a magnetostrictive metal layer simply formed on the knurl grooves, it is impracticable to expect that the strength of the magnetostrictive metal layer is sufficient to withstand applied torque. In particular, in order to enable accurate measurement of a minute torque, it is necessary that the shaft material be configured to be of relatively small diameter so that the magnetically anisotropic portion can exhibit sufficient change in magnetic permeability in response to the torque applied. However, when an overload acts on a shaft of such a small diameter, the strength of the magnetostrictive metal layer falls short of the requirement, possibly resulting in degradation in sensor characteristics of the torque sensor comprised of the shaft.

DISCLOSURE OF THE INVENTION

Therefore, it is an object of the present invention to provide a torque sensor shaft which eliminates the foregoing problems, and which can be advantageously used in constructing a highly sensitive magnetostrictive torque sensor and yet has high strength characteristics.

In order to accomplish the above object, according to the invention there is provided a method for producing a magnetostrictive torque sensor shaft which comprises machining the surface of shaft base material to form thereon knurl grooves inclined relative to the axis of the shaft base material, then heat treating the shaft base material, then subjecting the shaft base material to surface treatment as required for improving the strength of bond between the shaft base material and a magnetostrictive layer to be later formed on the surface thereof, and/or for improving the sensor characteristics of a torque sensor to be constructed from the torque sensor shaft, and subsequently forming a magnetostrictive layer of a predetermined thickness by a chemical process and/or a physical process, such as plating and thermal spraying, at least on the surface of the knurl grooves included in the outer periphery of the shaft base material.

Torque sensor shafts, made according to this method, were used in constructing magnetostrictive torque sensors. It was found that the torque sensor shaft of the invention had sufficient mechanical strength required of a torque transmitting shaft and yet was qualified to make a highly sensitive torque sensor which had never been made from any conventional torque sensor shaft. Further, the torque sensor exhibited sufficient service durability.

The reason why a torque sensor having such high sensitivity could be made using the torque sensor shaft of the invention is not particularly clear, but for the present purpose it may be explained by the following factors. Conceivably, the sensitivity of a magnetostrictive torque sensor depends on three factors with respect to the magnetically anisotropic portion of the sensor shaft of the sensor, namely, area effect, stress concentration effect, and magnetic effect. According to the invention, as will be explained in detail hereinafter, in contrast to the case of the prior art, considerable improvement is achieved in general effect of these three factors, with the result that a torque sensor of such high sensitivity is realized.

Furthermore, according to the invention, torque sensor hysteresis can be effectively reduced. The process involved is comparatively simple and this permits mass production at lower cost.

For the material of the magnetostrictive layer, materials having a relatively low crystallomagnetic anisotropy constant and relatively large saturation magnetization and magnetostriction constants are preferably used. Conceivably, the reason for this is that the sensitivity of a torque sensor is proportional to the saturation magnetization and magnetostriction constants and is inversely proportional to the crystallomagnetic anisotropy constant.

DESCRIPTION OF THE PREFERRED EMBODIMENTS

As described above, according to the present invention, it is possible to construct a torque sensor having high sensitivity and good service durability. The reason for this, though not particularly clear, may generally be explained by the following factors.

Figure 12:
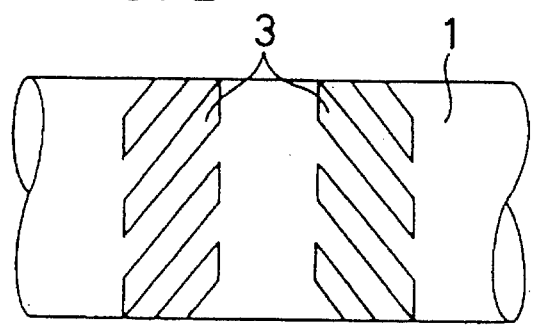
FIGS. 12 through 15 are illustrations for explaining the area of magnetically anisotropic portions formed according to the invention in comparison with that of the prior art.
Figure 13:
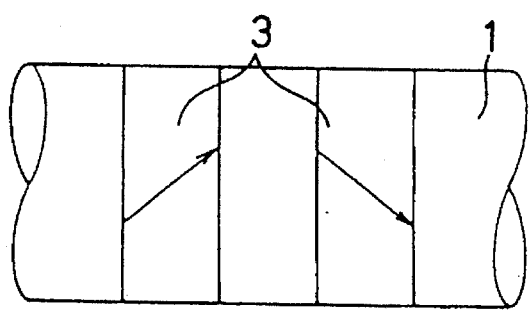
Figure 14:
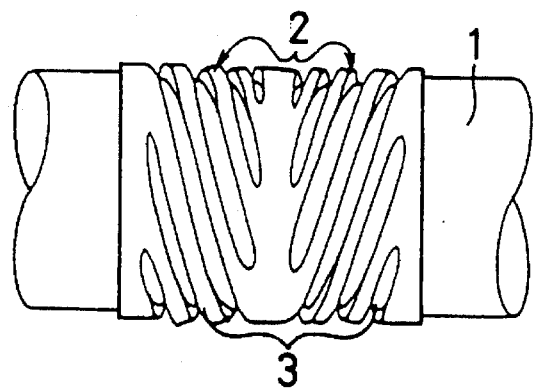
Figure 15:
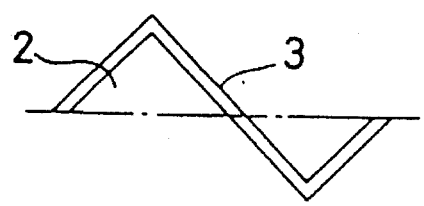

Conceivably, the sensitivity of a magnetostrictive torque sensor depends on three factors with respect to the magnetically anisotropic portion of the sensor shaft of the sensor, namely, area effect, stress concentration effect, and magnetic effect. For the purpose of comparison, let's consider cases in which magnetostrictive layers are formed by plating techniques: one case in which magnetostrictive layers of a chevron configuration are formed by partial plating as shown in FIG. 12; another case in which magnetostrictive layers having magnetic anisotropy imparted thereto in the directions of arrows are formed by full circumferential plating as shown in FIG. 13; and another case in which magnetostrictive layers are formed by knurling plating according to the present invention as shown in FIG. 14. FIG. 15 is a modelled representation of a section of a part taken along the periphery of the magnetostrictive layers shown in FIG. 14.

In these figures, the reference numeral 1 designates a torque sensor shaft, 2 designates a knurl portion formed over the entire periphery of the shaft surface, 3 designates a magnetostrictive layer formed by plating. In FIG. portions having magnetostrictive plated layers 3 and portions having no such layer are alternately formed at circumferentially equal intervals.

For the sake of simplicity, it is assumed that the foregoing three kinds of magnetostrictive layers are all plated under same conditions. By so assuming it is possible to consider that the magnetic effects to which they are subject are even and, therefore, to omit the factor of magnetic effect from consideration. Accordingly, it suffices to consider the other two factors, namely, area effect and stress concentration effect.

For purposes of comparison, the area effect and stress concentration effect under partial plating, shown in FIG. 12, are both standardized to value "1". Then, with respect to magnetostrictive layers formed by partial plating, an overall effect will be a product of the area effect multiplied by the stress concentration effect, i.e., 1×1=1.

In the case of magnetostrictive layers formed by full circumferential plating as shown in FIG. 13, the area of magnetostrictive layers 3 will be two times as large as that in the case of the magnetostrictive layers in FIG. 12. Therefore, while there is no change in stress concentration effect, the area effect is doubled, which results in an overall effect of 2×1=2.

Nextly, the knurling plating process of the invention in FIG. 12 will be explained. For the sake of simplicity, it is assumed that each ridge or furrow of the knurl portion 2 is configured to be a rectangular equilateral triangle in cross section as shown in FIG. 15, in which case the area of each magnetostrictive layer 3 is 2√2. The stress concentration effect at each knurl portion 2 is found to be about 1.5 times that in the case of a shaft having a smooth periphery as a result of a stress analysis with respect to Example 1 to be described hereinbelow. Therefore, an overall effect of this process is:

2√2·1.5=4.2

In this way, according to the invention, it is possible to provide a high sensitivity torque sensor having far much greater improvement in overall effect over any prior art torque sensor of the type.

Figure 7:
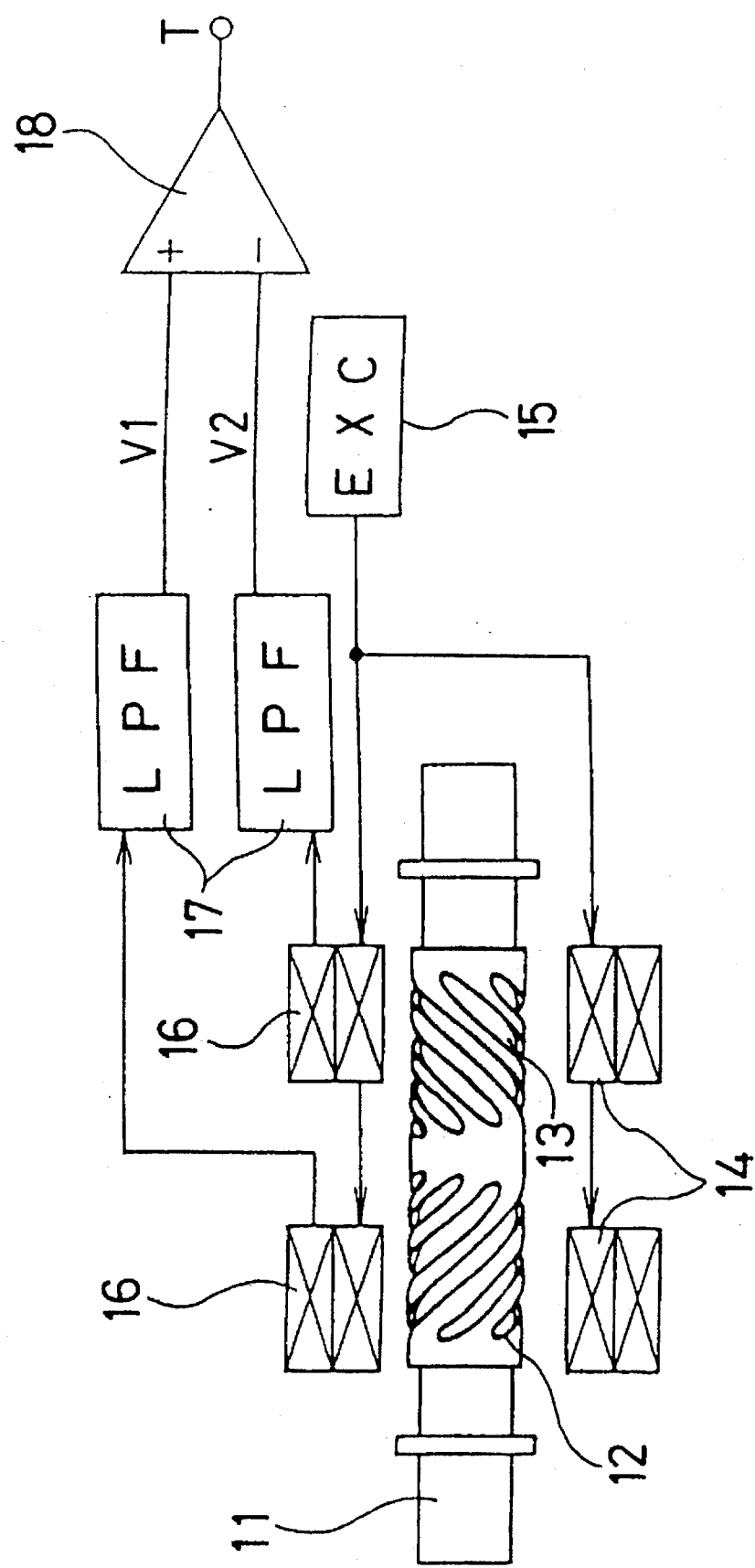
FIG. 7 is a circuit diagram for the torque sensor according to the invention.

FIG. 7 shows one example of a torque sensor incorporating a magnetostrictive torque sensor shaft 11 according to the present invention. This shaft 11 has a pair of magnetically anisotropic portions 12, 13 formed about the outer periphery thereof. Shown by 14, 14 are excitation coils disposed for supplying magnetic fields to the magnetically anisotropic portions 12, 13 which are supplied with excitation current from an excitation circuit 15. Sensor coils 16, 16 detect a change in the magnetic permeability of the magnetically anisotropic portions 12, 13 when torque is applied to the shaft 11. The Bensor coils 16, 16 are connected through lowpass filters 17, 17 to a differential amplifier 18 by which a torque signal T is provided. It is to be noted that the invention, in practical modes thereof, includes, in addition to the case in which the torque sensor shaft has a pair of magnetically anisotropic portions 12, 13 as above stated, a case in which the shaft has only one magnetically anisotropic portion, which case is of course effective as well.

Figure 1:
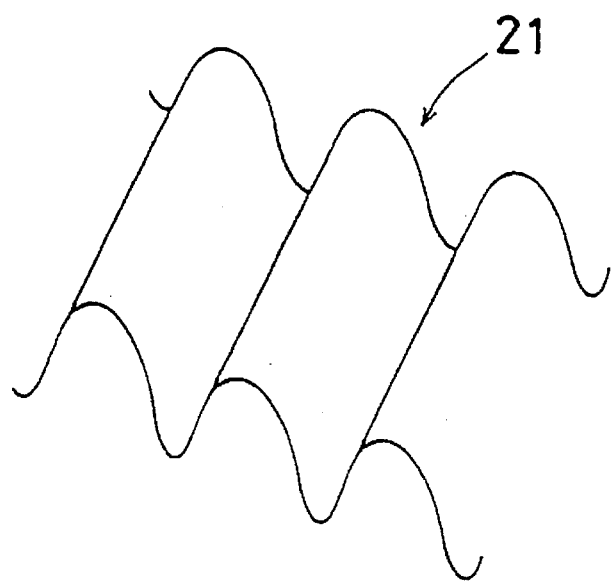
FIG. 1 is a diagram showing a first step in the method for producing a magnetostrictive torque sensor shaft representing one embodiment of the present invention.

FIG. 1 to 4 illustrate the method of making a torque sensor shaft 11. The base material of the shaft 11 is a structural steel, such as SCM material (chromium-molybdenum steel) or SNCM material (nickel-chromium-molybdenum steel), as prescribed in JIB (Japanese Industrial Standards). On the surface of the shaft 11 are formed knurl portions 21 as shown in FIG. 1 which serve as magnetically anisotropic portions 12, 12 shown in FIG. 7, by cutting, knurling or rolling, the knurl portions being inclined ±25 degrees relative to the axis of shaft. Configurational magnetic anisotropy is given by the knurl portions 21 to the material of the shaft.

Then, the base material of the shaft which is formed with the knurl portions 21 is subjected to heat treatment for imparting the required axial strength to the shaft. This heat treatment comprises general shaft strengthening heat treatment for structural steel, such as carburizing, quenching, and tempering, or induction hardening and tempering.

Figure 2:
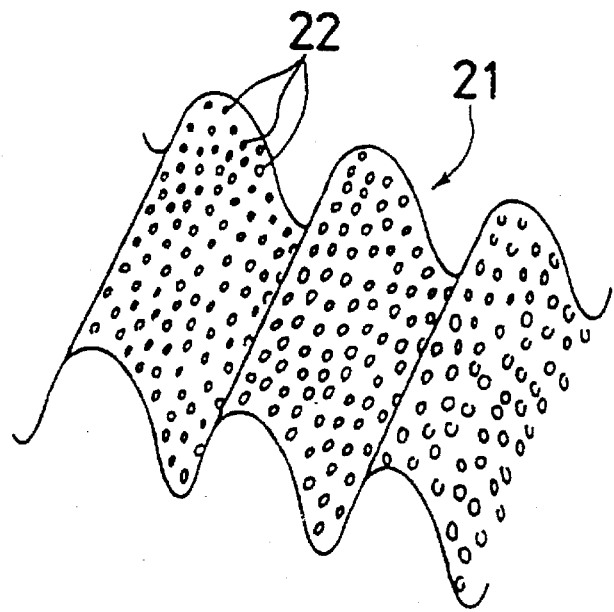
FIG. 2 is a diagram showing a step following the step shown in FIG. 1.

Then, in order to provide for improvement in the bond between the shaft base material and magnetostrictive layers to be hereinafter described and for improvement of sensor characteristics, the surface of the shaft base material is subjected to base treatment for formation of magnetostrictive layers. One such base treatment is to form a multiplicity of fine depressions 22 on the surface of the shaft base material. For example, shot peening is especially preferred for application to knurl portions 21 as shown in FIG. 2. Application of shot peening in this way provides for improvement in the bond with the shaft base material of the magnetostrictive layers which are formed by plating or thermal spraying as described hereinafter. Shot peening is also advantageous in that it provides for hysteresis reduction and sensitivity improvement. It is to be noted, however, that where a high degree of bond between the shaft base material and the magnetostrictive layers is obtainable as in the case of nickel strike plating, such treatment as shot peening need not be effected. In case that the surface of the shaft base material contains Cr, nickel strike plating may be advantageously carried out in the base treating stage. In other words, shot peening or nickel strike plating is carried out in the stage of base treating.

Figure 3:
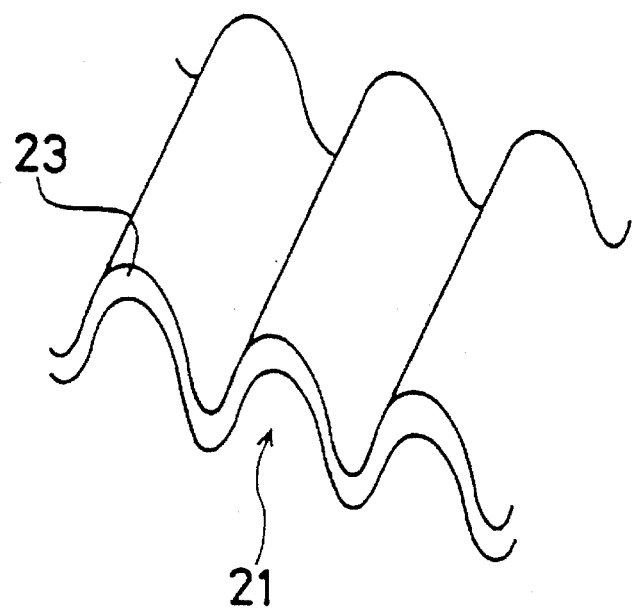
FIG. 3 is a diagram showing a step following the step shown in FIG. 2.
Figure 4:
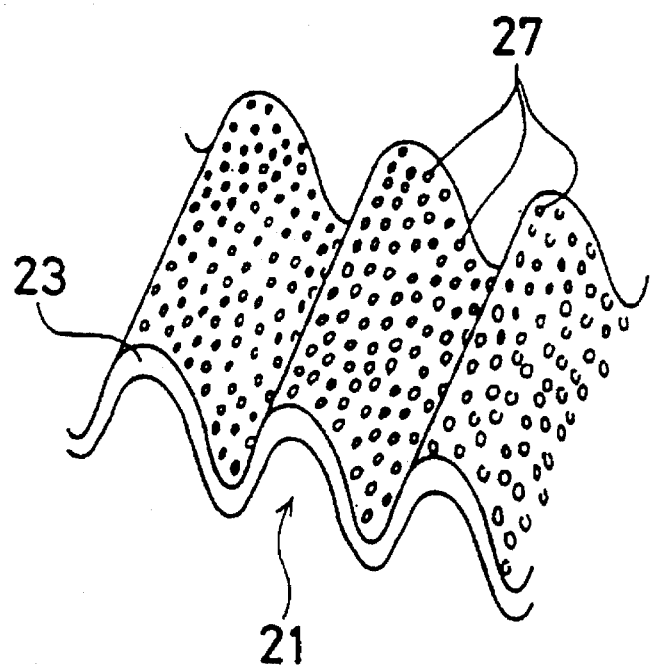
FIG. 4 is a diagram showing a step following the step shown in FIG. 3.
Figure 5:
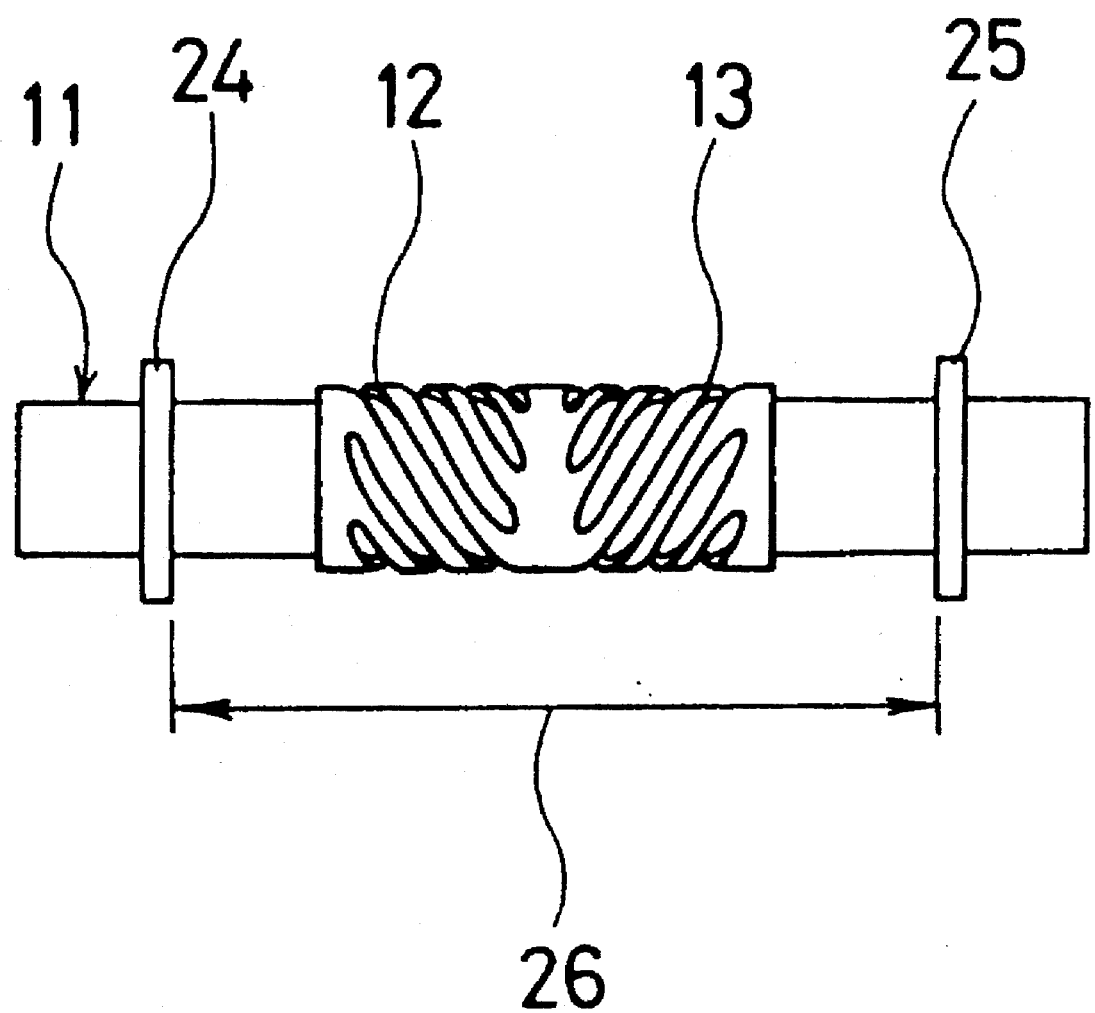
FIG. 5 is a view showing a formation range of magnetostrictive layers according to one embodiment of the invention.

Subsequently, magnetostrictive layers 23 as shown in FIG. 3 are formed by plating, thermal spraying or otherwise at least on the surface of the knurl portions 21 which is included in the outer periphery of the shaft base material. In this case, various methods for forming magnetostrictive layers are available which include, in addition to the foregoing plating and thermal spraying techniques, CVD process and PVD processes (such as vacuum deposition, sputtering, and ion plating), any of which methods may be employed as desired. For example, as shown in FIG. 5, such magnetostrictive layers 23 may be conveniently formed over a full range 26 between a pair of flanges 22, 25 which is formed on the shaft 11 so as to enclose two magnetostrictive portions 12, 13 therebetween. For the constituent material of such magnetostrictive layer 23 is used a soft magnetic material, such as Ni, FeNi alloy, FeCo alloy, or FeAl alloy, which has a relatively low crystallomagnetic anisotropy constant and, on the other hand, has relatively large saturation magnetization and magnetostriction constants. Where an Fe alloy is used, the magnetostriction constant thereof is positive in value, as is the case with the structural steel or base material of the shaft 11. When the magnetostriction constant of the shaft base material is of same polarity as the magnetostriction constant of the magnetostrictive layer in this way, a magnetostrictive layer can be formed thin without involving any possibility of mutual sensitivity negation between the base material and the magnetostrictive layer, which is very convenient for the purpose of magnetostrictive layer forming.

In contrast, an Ni alloy has a magnetostriction constant of negative value and exhibits opposite characteristics relative to the base material of the shaft 11. In order to prevent them from interfering with each other, therefore, it is required that the thickness of the magnetostrictive layer 23 is greater than the skin depth through which magnetic flux will pass, preferably more than two times the skin depth. The skin depth $\delta$ through which flux will pass is calculated according to the following equation:

$$\delta = \frac{\sqrt{\rho}}{\sqrt{(\omega\mu)}}$$

In the equation, $\omega$ represents excitation angular frequency, $\rho$ represents resistivity of the magnetostrictive layer, and $\mu$ represents magnetic permeability of the magnetostrictive layer. For example, where excitation is to be effected at an excitation frequency of 50 kHz, the skin depth of SCM material is 85 micron, the skin depth of Ni material is 15 micron, and the skin depth of PB permalloy of JIB (e.g., Ni 47%- Fe 53% alloy) is 20 micron. Generally, it is desirable that a magnetostrictive layer 23 is formed to a thickness of more than 40 micron.

After having been formed in this way, the magnetostrictive layer 23 is subjected to stabilization heat treatment for stabilizing the material structure of the magnetostrictive layer 23.

Subsequently, the layer surface is subjected to shot peening, whereby a multiplicity of fine depressions 27 is formed on the surface of the magnetostrictive layer 23. Formation of such fine depressions provides for improvement in the magnetic characteristics of the surface of the magnetostrictive layer 23, which results in improved sensor hysteresis and further improvement in sensor sensitivity.

Finally, in order to stabilize the material structure of the magnetostrictive layer 23 which has been subjected to shot peening, stabilization heat treatment is carried out again.

Figure 6:
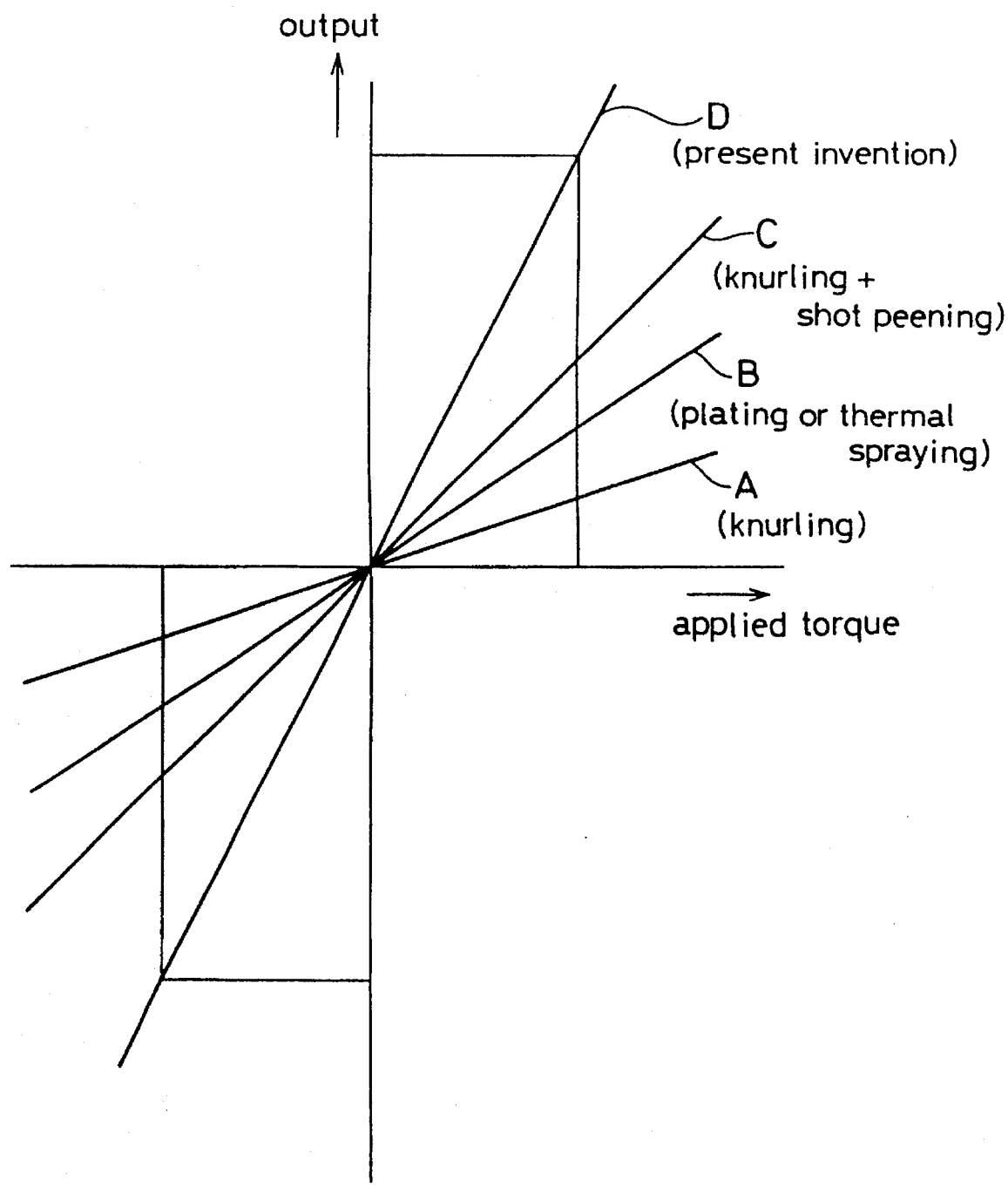
FIG. 6 is a diagrammatic illustration showing the sensitivity of a torque sensor according to the invention in comparison with the sensitivity of torque sensors according to the prior art.

FIG. 6 shows a comparison in sensitivity characteristics of a torque sensor 1 made according to the method of the invention with torque sensor shafts made by prior art methods.

The transverse axis denotes applied torque and the axis of ordinate denotes output voltage. In the figure, the steeper the line inclination, the higher is the sensitivity.

Line "A" represents the sensitivity characteristic of a torque sensor shaft obtained from the process of knurling followed by heat treatment. Line "B" represents the sensitivity characteristic of a torque sensor shaft having a magnetostrictive layer formed on its surface through the process of plating or thermal spraying as shown in FIG. 12 or 13. From the figure, sensitivity improvement is apparent as compared with "A", which tells improvement in the characteristics of the magnetically anisotropic portion. Line "C" represents the sensitivity characteristic of a torque sensor shaft from the process of shot peening after knurling, which relates to a shaft similar to the one disclosed in above mentioned Japanese Patent Application Laid-Open No. 2-221830. The effect of shot peening is reflected in further sensitivity improvement over the case of "B". Line "D"

represents the sensitivity characteristic of a torque sensor made according to the invention. Apparently, considerable improvement in sensitivity is seen over the shafts made by the prior art methods.

Nextly, examples of the method of the present invention will be explained.

EXAMPLE 1

An SCM structural steel having an outer diameter of 6 mm was knurled thereby to form on the outer periphery thereof, over an width of 12 mm, a knurl portion comprising a series of knurls having a ridge height of 0.3 mm and arranged at a pitch of 1.3 mm. After heat treating, Ni plating was effected on the knurl portion included in the shaft surface, whereby a magnetostrictive layer was formed. For this purpose, the electrolytic plating process was employed in which an $NiSO_4$— $NiCl_2$ —$H_3BO$ bath, or a so-called Watt bath, was utilized as a nickel plating bath. An Ni plated layer as a magnetostrictive layer was formed to a thickness of about 80 micron. Subsequently, a temperature stabilization heat treatment was carried out at 170° C. for 4 hours. Then, the surface of the magnetostrictive layer was subjected to shot peening under a striking force applied so as not to strip the magnetostrictive layer off. Shot particles used were cast iron particles having a particle size of 44 micron, and the arc height was 0.1 mmN. Finally, a temperature stabilization heat treatment was again carried out at 170° C. for 4 hours.

At each treating stage, a torque sensor was constructed and the same was tested as to its characteristics under an excitation angular frequency of 50 kHz. The results are shown in Table 1.

TABLE 1

|  | V1 (V2) | Sensitivity | S / N | Hysteresis |
|---|---|---|---|---|
| After heat treatment | 3300 mV | 10.8 mV | 0.16% (1) | 2% |
| Ni plating | 1950 mV | −75.3 mV | 1.9% (11.9) | 5% |
| Temp. stabilization (170° C., 4 hr) | 2200 mV | −186.6 mV | 4.2% (26.3) | 3% |
| Shot peening | 2000 mV | −74.1 mV | 1.9% (11.9) | 4% |
| Temp. stabilization (170° C., 4 hr) | 2150 mV | −215.8 mV | 5.0% (31.3) | 0.4% |

In Table 1, V1, V2 represent post-commutation values for respective output voltages of sensor coils 16, 16 under unloading condition in FIG. 7. The term "sensitivity" refers to the balance between V1 and V2 when rated torques, positive and counter, are applied to shaft 11, which corresponds to a torque signal. In the present instance, a rated torque of 0.05 kgm was applied.

"S/N" represents a nondimensional value of sensitivity. As is apparent from Table 1, values of V1 and V2 under unloading condition after each treating stage are not uniform even when excitation voltages at excitation coils 14, 14 are controlled constant. Therefore, direct comparison of "sensitivity" values does not permit accurate sensitivity comparison. Therefore, for the purpose of accurate sensitivity comparison, a value for the following equation:

$$|V1-V2|/(V1+V2)$$

was calculated and the value so calculated was taken as S/N value.

Hysteresis refers to the hysteresis value for the torque sensor itself.

As is apparent from Table 1, by carrying out temperature stabilization heat treatment after Ni plating, considerable improvement in S/N value was achieved, as compared with the case in which heat treatment was simply given after the stage of knurling. Value in parentheses represents the S/N ratio at each respective processing stage when the S/N value at a point of time just after heat treatment is taken as "1". Subsequent shot peening and temperature stabilization heat treatment resulted in further improvement in S/N value.

Where sensitivity values are shown negative, it is understood that such negative presentation is due to the fact that the magnetostriction constant of Ni takes a negative value. As shown, improvement in S/N value is seen only after the stage of temperature stabilization heat treatment. In the case of the magnetostrictive layer formed by Ni plating, such improvement may be explained by the fact that the residual stress of the Ni plated magnetostrictive layer is stabilized only through the temperature stabilization heat treatment.

Similarly, the temperature stabilization heat treatment given after Ni plating resulted in improvement in sensor hysteresis. This effect of hysteresis improvement is particularly remarkable when shot peening is carried out after plating.

EXAMPLE 2

In same manner as in EXAMPLE 1, a knurl portion was formed on shaft material and then heat treatment was carried out. Then, in order to improve the bonding strength of a thermal spray layer to be described hereinafter, the shaft surface including the knurl portion was subjected to shot peening with alumina particles having a particle size of 0.3 mm. Nextly, FeNi alloy was thermally sprayed over that surface portion to form a magnetostrictive layer. For thermal spraying was used an Ni 47% Fe 53% alloy (PB permalloy, JIS) having an average particle size of 6 micron. Oxy-fuel plasma spraying was carried out under spray conditions of: current, 500 A; Ar flow rate, 60 lit/min; hydrogen flow rate, 3 lit/min; powder input nozzle diameter, 1.86 mm; and angle of powder introduction, 105 degrees. A magnetostrictive layer having a sprayed layer thickness of 80 micron was formed under these conditions.

Torque sensors were constructed at respective processing stages and were tested as to their characteristics, under an excitation angular frequency of 50 kHz. The results are shown in Table 2. The torque applied was 0.2 kgm.

TABLE 2

|  | V1 (V2) | Sensitivity | S / N | Hysteresis |
|---|---|---|---|---|
| After heat treatment | 3300 mV | 43.2 mV | 0.65% | 2.34% |
| After thermal spraying | 3420 mV | 83.2 mV | 1.22% | 0.31% |

As is apparent from Table 2, by forming a magnetostrictive layer by thermal spraying, considerable improvement in S/N value and hysteresis was achieved, as compared with the case in which only heat treatment was given after the process of knurling. When such spraying was effected, performance improvements as shown in Table 2 were possible without subsequent shot peening and temperature stabilization heat treatment.

Nextly, the reason for sensitivity change according to the difference in the constituent material of the magnetostrictive layer will be explained. When torque is applied on a sensor shaft of FIG. 3 configuration, the stress acting on the outermost surface layer of the base material at the knurl portion 21 is taken as σs, and the stress acting on the magnetostrictive layer 23 is taken as σm. The sensor sensitivity of a knurled shaft alone is taken as Span-s, and the sensor sensitivity when a soft magnetic magnetostrictive layer is formed on the knurl portion is taken as Span-m. Provided that the magnetostrictive layer is formed to a thickness greater than the skin depth which is necessary and sufficient, such that magnetic flux will pass through only the magnetostrictive layer. Then, the following equation will generally hold;

$$Span = k \times S \times \sigma \times \Lambda$$

where k represents a constant, S represents the area of a region through which magnetic flux will pass, and a represents acting stress. Character Λ represents a coefficient of inverse magnetostriction effect ( a factor for the Villari reversal) such that where magnetic flux is B, $$\Lambda = \partial B / \partial \sigma.$$

Therefore, Span-s and Span-m are expressed as follows:

$$Span\text{-}s = k \times S \times \sigma s \times \Lambda s$$

$$Span\text{-}m = k \times S \times \sigma m \times \Lambda m$$

From the above two equations, $$Span\text{-}m / Span\text{-}s = (\sigma m \times \Lambda m) / (\sigma s \times \Lambda s)$$

Where Young's modulus of the shaft material is Es, and Young's modulus of the magnetostrictive layer is Em, since strains of the shaft material and the magnetostrictive layer at their boundary are equal, the above equation is rewritten as:

$$Span\text{-}m / Span\text{-}s = (Em/Es) \times (\Lambda m / \Lambda s)$$

Thus, the sensitivity ratio is the product of the Young's modulus ratio multiplied by the inverse magunetostriction effect ratio.

For example, where the shaft material is SCM structural steel and the magnetostrictive layer is formed of 47Ni permalloy, that is, PB permalloy, the ratio is:

$$\begin{aligned} Span\text{-}47\ permalloy/Span\text{-}s &= (14000/21000) \times (1925/57) \\ &= 22.5 \end{aligned}$$

If the shaft material is SCM structural steel and the magnetostrictive layer is formed of Ni, the ratio is:

$$\begin{aligned} Span\text{-}Ni/Span\text{-}s &= (22000/21000) \times (475/57) \\ &= 8.7 \end{aligned}$$

In order to enhance the torque sensor sensitivity by forming a magnetostrictive layer on the surface of the shaft material, when considered in terms of linear proximation, it is desirable to select such material that will tend to magnify the product of the Young's modulus ratio multiplied by the inverse magnetostriction effect ratio, as material for both the shaft and the magnetostrictive layer, more particularly as material for the magnetostrictive layer.

For this purpose, it is necessary to lower the working stress developing at the magnetostrictive layer because the soft magnetic magnetostrictive material which constitutes the magnetostrictive layer is generally of low strength. To this end, it is desirable to reduce the Young's modulus ratio Em/Es to less than 1 and yet it is necessary to select material so that $(Em/Es) \times (\Lambda m/\Lambda s)$ is larger than 1. Referring to the above noted sensitivity ratios, selection of PB permalloy for the magnetostrictive layer results in greater torque range applicable without detriment to the sensor characteristics than in the case of Ni being selected for the magnetostrictive layer. The reason for this is that the Young's modulus ratio of PB permalloy to the shaft material steel is smaller than 1 so that the developing stress is relatively smaller as compared with the case of Ni being used.

The foregoing description is tabulated in Table 3, wherein:

$$\Lambda = 0.77 \lambda sBs/K$$

where, λs represents magnetostriction constant for each material; B s represents saturation magnetization thereof, and K represents crystallomagnetic anisotropy constant thereof.

TABLE 3

|  | E (kg/mm²) | λ s | Bs (gauss) | K (erg/mm³) | Λ (G/kg/mm²) | sensitivity |
| --- | --- | --- | --- | --- | --- | --- |
| Base metal SNCM815 | 21000 | 26 × 10⁻⁶ | 1.5 × 10⁴ | 40 × 10⁴ | 57 | 1 |
| Ni | 22000 | 35 × 10⁻⁶ | 0.6 × 10⁴ | 3.4 × 10⁴ | 475 | 8.7 |
| PB permalloy Ni47Fe53 | 14000 | 25 × 10⁻⁶ | 1.5 × 10⁴ | 1.5 × 10⁴ | 1925 | 22.5 |

EXAMPLE 3

An SNCM structural steel having an outer diameter of 15 mm was subjected to knurling and was then heat treated for shaft reinforcement. Thereafter, shot peening was carried out using cast steel shot particles having a particle size of 177 micron, by way of pretreatment for improving the bond between a magnetostrictive layer and the shaft base material. After the shaft material was cleaned by acid pickling and otherwise, by way of another pretreatment for magnetostrictive layer forming, nickel strike plating was effected to a thickness of 1 to 2 micron. For the purpose of plating a base material like aforesaid SNCM structural steel which contains chromium, nickel strike plating is necessary in order to provide improved bond performance of plated layer.

Then, FeNi alloy plating was effected on the nickel strike plated surface to form a magnetostrictive layer having a thickness of 100 micron. A Watt bath was employed as plating bath. In this case, the Fe—Ni content ratio in the alloy was varied to obtain plural kinds of shafts. Finally, these shafts were subjected to heat treatment (at 200° C. for 4 hrs) for stabilizing the residual plating stress.

Figure 8:
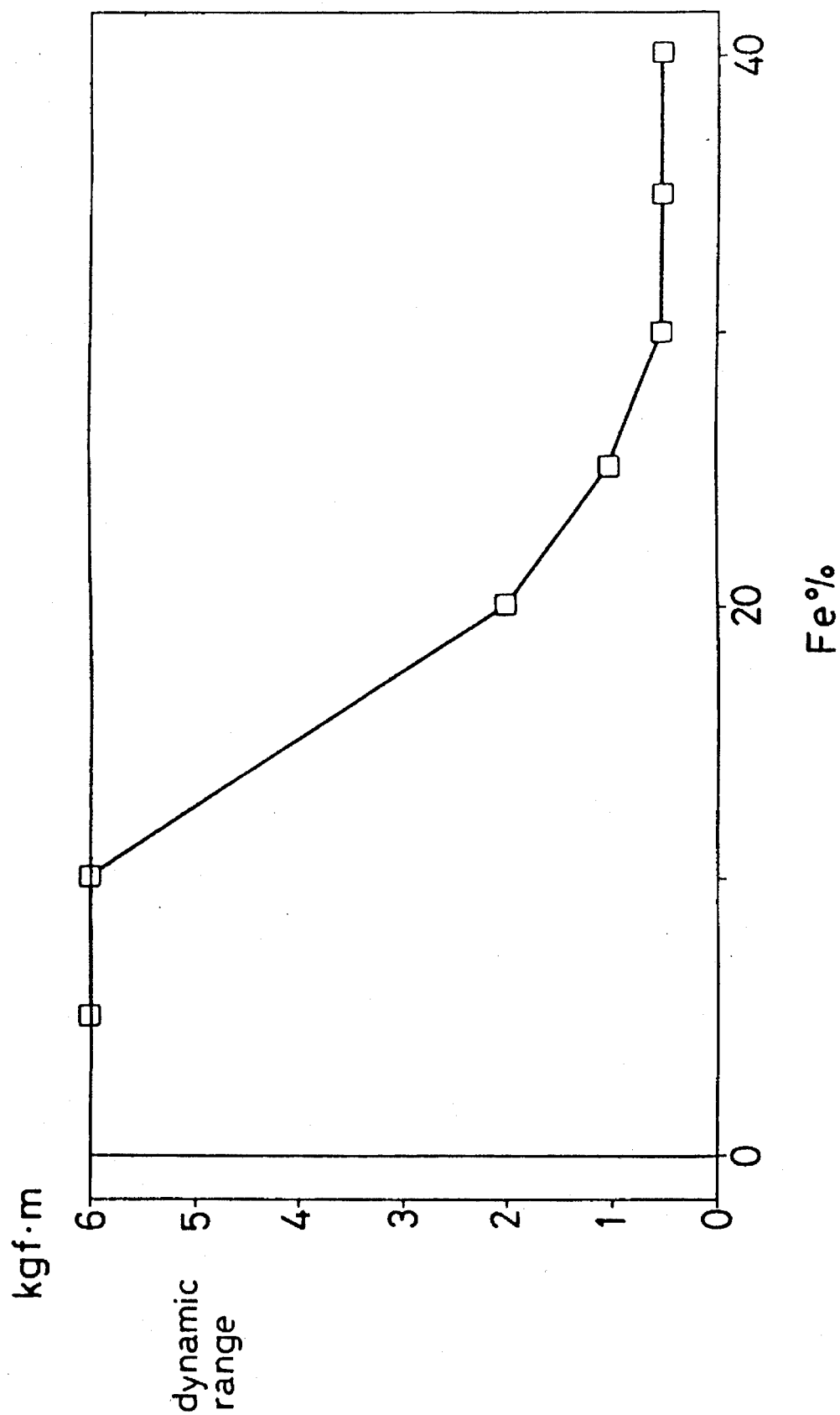
FIG. 8 is a graphic representation showing, by way of example, dynamic range characteristics of a torque sensor according to the invention.

FIG. 8 shows an aspect of the dynamic range as observed when the Fe content was varied. The dynamic range is represented by torque loads within which the torque sensor outputs maintain linearity. As shown, a large dynamic range was obtained within an Fe content range of less than 25%.

Figure 9:
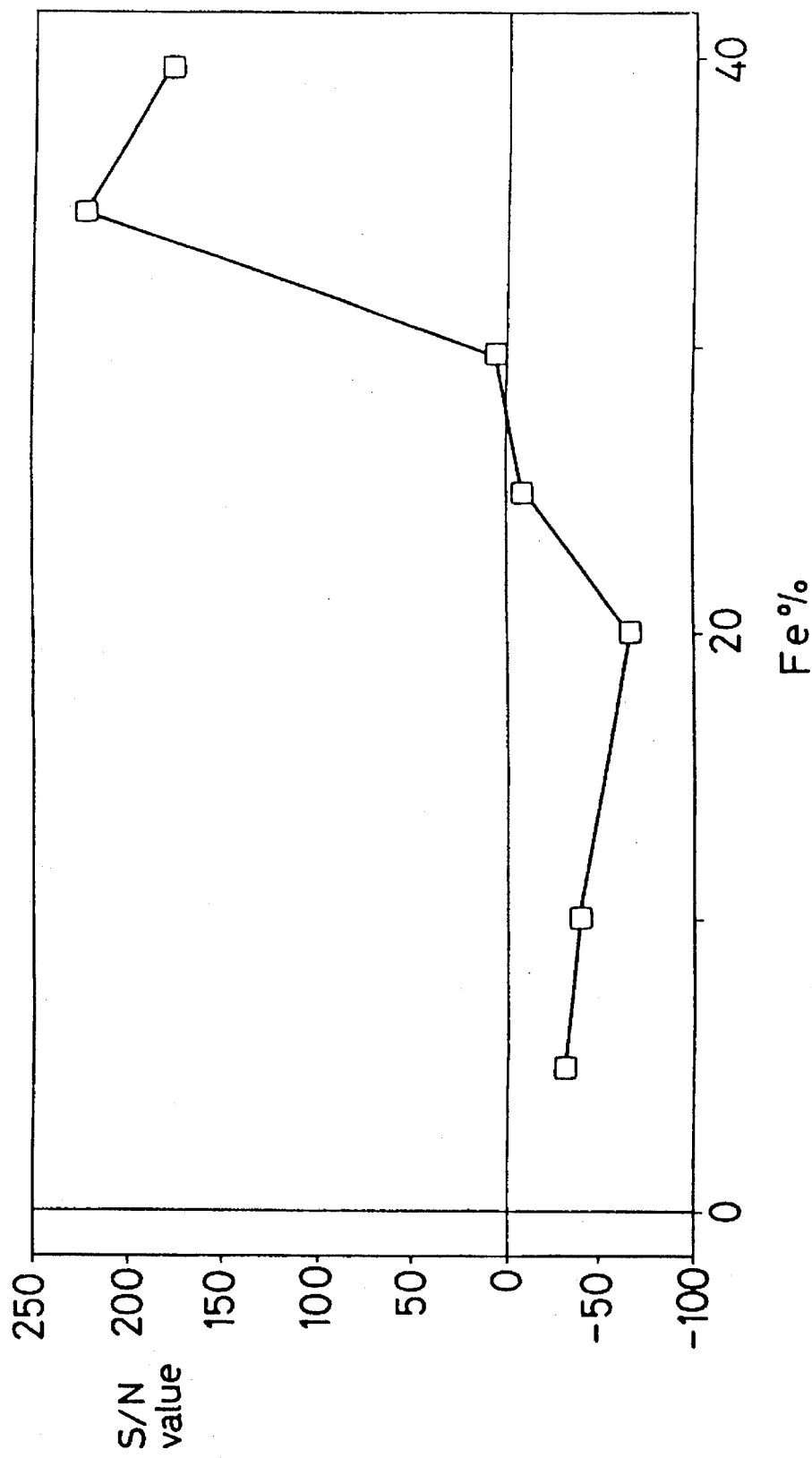
FIG. 9 is a graphic representation showing, by way of example, relative sensitivity characteristics of the torque sensor of the invention.

FIG. 9 shows changes in sensor relative sensitivity, or S/N value as observed when the Fe content was varied. In the present instance, as in the case of EXAMPLE 1, S/N values were calculated with respect to Ni- Fe plated sensor shafts on the basis of S/N value for SNCM steel shaft material subjected to heat treatment only which was taken as 1. As shown, with 25 to 30% Fe content as a border line, sensitivity characteristics become inverted in polarity. That is, high sensitivity was obtained when the Fe content was less than 25%, and again very high sensitivity was obtained when the Fe content was 35 to 40%.

Figure 10:
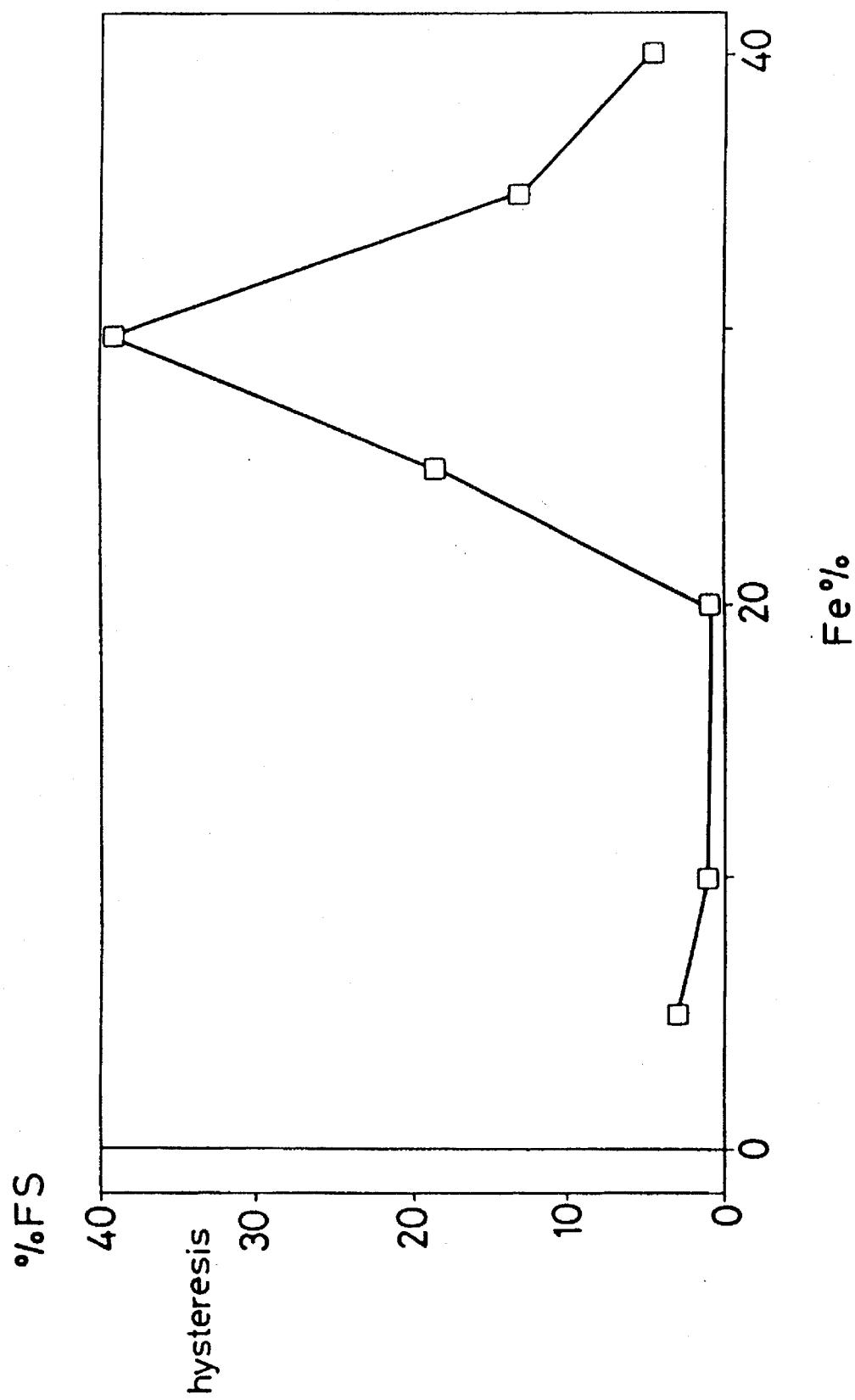
FIG. 10 is a graphic representation showing, by way of example, hysteresis characteristics of the torque sensor of the invention.
Figure 11:
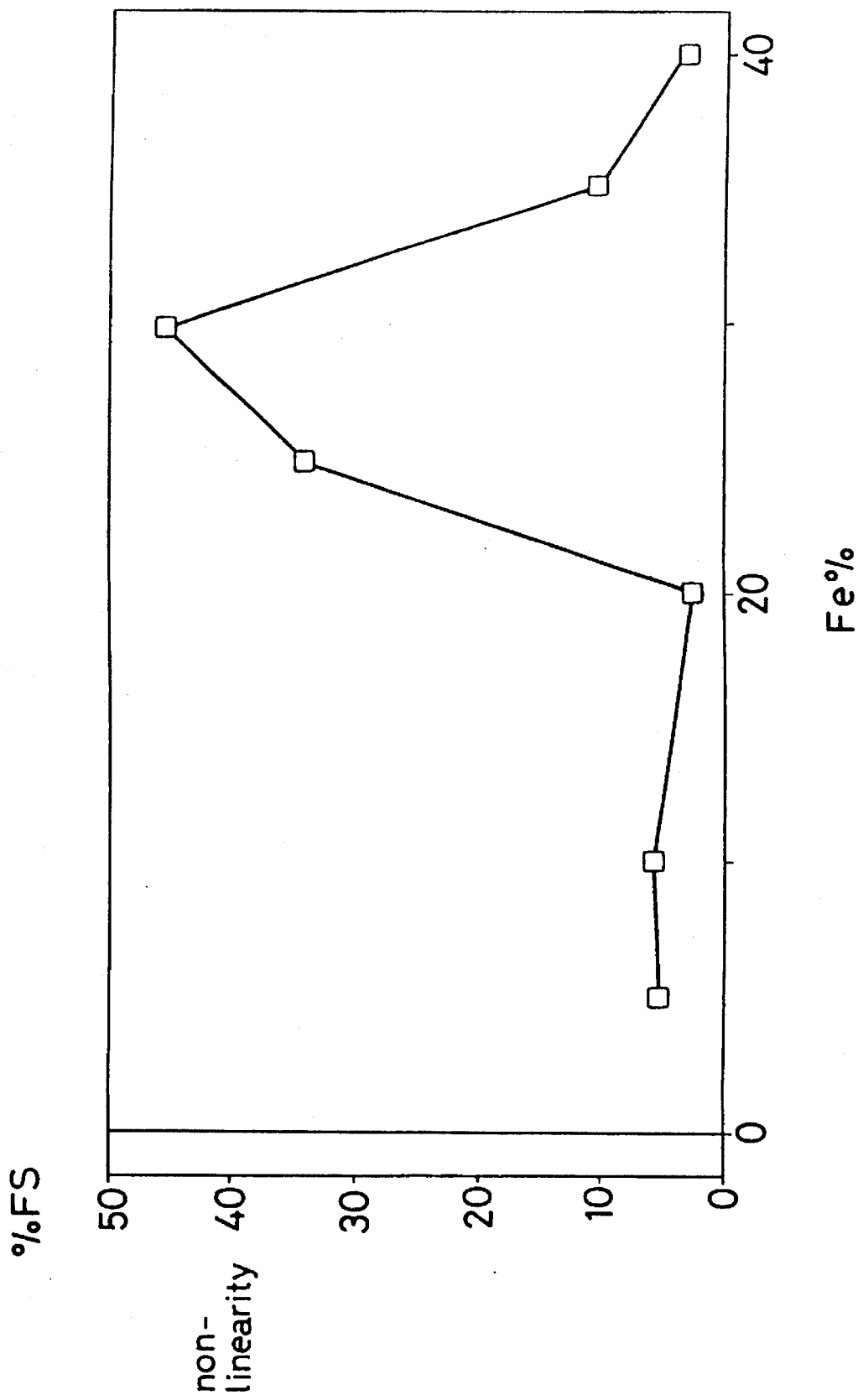
FIG. 11 is a graphic representation showing, by way of example, nonlinearity characteristics of the torque sensor according to the invention.

FIGS. 10 and 11 show sensor hysteresis and nonlinearity aspects when, with the Fe content varied, torque values in the FIG. 8 dynamic range were applied. In both characteristic aspects, satisfactory values were witnessed when the Fe content was less than 25%.

In this way, torque sensor characteristics were found satisfactory when the Fe content of FeNi alloy plating was in a range of less than 25%. More specifically, this Fe content range is advantageous in that it permits larger dynamic range and limits hysteresis to less than 1%. Further, it was found that within this Fe content range, S/N value is of the order of 20 or more, it being thus possible to obtain high sensitivity sensors suitable for practical application.

It is required that the dynamic range is as large as possible. From the standpoint of long sensor stability and, in particular, resistance to repetitive torque, it is very advantageous to employ a sensor shaft having such a large dynamic range, with actual service range limited to a lower torque range than the dynamic range.

The relationships of dynamic range with hysteresis and nonlinearity will be explained. As may be seen from FIGS. 9 to 11, shafts having a large dynamic range, on the average, exhibited good hyseresis and nonlinearity characteristics. Conceivably, this tells that a shaft having a large dynamic range is unlikely to suffer micro-order plastic deformation of shaft material due to torque application, which fact contributes toward satisfactory hysteresis and nonlinearity characteristics.

Nextly, the results of endurance tests will be explained. An SNCM 815 material having an outer diameter of 15 mm similar to the above mentioned material was subjected to plating with an Fe 5% Ni 95% alloy to a thickness of 100 micron to provide a torque sensor shaft. The shaft had a dynamic range of 6 kgm. Repetitive torques of ±4 kg were applied to the torque sensor shaft in carrying out $10^7$ times endurance tests. The results of the tests are shown in Table 4.

Also, cold impact tests were conducted. Tests at 100° C. for 2 hrs and at −30° C. for 2 hrs were alternately repeated for 100 cycles. Changes in sensor characteristics are shown in Table 5.

TABLE 4

| Sensor characteristics | Before endurance test | After endurance test | Change |
|---|---|---|---|
| Sensitivity (when ±4 kgm applied) | 1028 mv | 1040 mv | +1.2% FS |
| Hysteresis | 0.4% FS | 0.3% FS | −0.1% FS |
| Nonlinearity | 0.9% FS | 1.3% FS | +0.4% FS |

TABLE 5

| | Change |
|---|---|
| Sensitivity (when ±4 kgm applied) | −0.6% FS |
| Hysteresis | −0.2% FS |
| Nonlinearity | −0.3% FS |

In conjunction with the foregoing endurance test and cold impact test results, the durability of a sensor shaft having a magnetostrictive layer formed by plating will be explained. Torque sensor shafts are required to have not only such good magnetic characteristics as high permeability and high magnetostriction constant, but also resistance to acting stress developed at the plated layer due to the applied torque, that is, fatigue resistance.

The earlier mentioned Japanese Patent Application Laid-Open No. 3-282338 teaches a method in which knurl grooves are formed on the surface of the shaft base material and further thereon is formed a magnetostrictive layer thereby to develop magnetic anisotropy on the surface of the shaft. However, with this known sensor shaft wherein a magnetostrictive layer is formed on the surface of the knurl grooves simply by plating, it is not possible to provide sufficient shaft durability or fatigue resistance.

With reference to this durability aspect, fatigue resistance of the plated layer itself and also fatigue resistance of the bond interface between the plated layer and the shaft base material are important factors to be considered.

First, the problem of fatigue resistance of the plated layer itself will be explained. With prior art plated sensor shafts, the trouble is that the dynamic range is so small that when a torque of the order of the dynamic range is applied, the plated layer is subject to plastic deformation at micro level in its grain bound. Therefore, when repetitive torque is applied, plastic deformation occurs in a comparatively weak grain bound, and metallurgical fatigue progresses beginning from this fatigue, with the result that changes occur in hysteresis, nonlinearity and sensitivity, thus deteriorating the performance characteristics of the sensor.

Next, the problem of fatigue resistance of the bond interface between the plated layer and the shaft base material will be explained. Even if the fatigue resistance of the plated layer is very high, if the strength of bond between the shaft base material and the plated layer is low, interlayer separation will occur with the layers while they are acted upon by repetitive stress due to applied torque, with the result that the shaft is rendered unavailable for use as a sensor.

In respect of these points, considerable improvement can be obtained according to the invention, as in present EXAMPLE 3 in which FeNi plating is carried out with the Fe content limited to 0 to 25%, thereby to provide improved sensor dynamic range. Further, in actual use, torque application is limited to a reasonably lower torque range within the dynamic range. In this way, it is possible to improve the fatigue resistance of the plated layer itself.

Furthermore, by way of preparatory treatment for plating, shot peening and or nickel strike plating were carried out to improve the strength of bond between the base material and the plated layer. This also results in good improvement in fatigue strength.

What is claimed is:

1. A magnetostrictive torque sensor shaft comprising knurl grooves formed on the surface of shaft base material in oblique relation to the axis thereof, the shaft base material strengthened by being heat treated after the formation of the knurl grooves, a surface treated layer formed on the heat treated shaft base material for improvement of the strength of bond between the shaft base material and a magnetostrictive layer and/or for improvement of the sensor characteristics of a torque sensor comprising the torque sensor shaft, the magnetostrictive layer formed at least on the surface of the knurl grooves included in the outer periphery of the shaft base material, having predetermined thickness and including a plated layer, a sprayed layer, or the like formed by a chemical process and/or physical process, wherein the magnetostrictive layer comprises an FeNi alloy plated layer, the Fe component content of the alloy plated layer being more than 0% but less than 25%.

2. A magnetostrictive torque sensor shaft as set forth in claim 1, wherein the shaft base material is a material selected from nickel-chromium steel and nickel-chromium-molybdenum steel.

3. A magnetostrictive torque sensor shaft as set forth in claim 1, wherein the magnetostriction constant of the constituent metal of the shaft base material and the magnetostriction constant of the constituent metal of the magnetostrictive layer are same in their positive and negative polarities.

4. A magnetostrictive torque sensor shaft as set forth in claim 1, wherein the magnetostriction constant of the constituent metal of the shaft base material and the magnetostriction constant of the constituent metal of the magnetostrictive layer are different in their positive and negative polarities, and wherein the thickness of the magnetostrictive layer is greater than the skin depth.

5. A magnetostrictive torque sensor shaft as set forth in claim 4, wherein the thickness of the magnetostrictive layer is more than twice the thickness of the skin depth.

6. A magnetostrictive torque sensor shaft as set forth in claim 1, wherein the magnetostrictive layer is formed of a soft magnetic material having a Young's modulus smaller than that of the shaft base material.

* * * * *